April 7, 1964    M. J. JORGENSEN, JR    3,127,871
INDIVIDUAL RESTING COMPARTMENTS FOR ANIMALS
Filed Aug. 31, 1961    2 Sheets-Sheet 1

INVENTOR.
Morgan J. Jorgensen, Jr.
BY
Andrus & Starke
Attorneys

April 7, 1964   M. J. JORGENSEN, JR   3,127,871
INDIVIDUAL RESTING COMPARTMENTS FOR ANIMALS
Filed Aug. 31, 1961   2 Sheets-Sheet 2

INVENTOR.
Morgan J. Jorgensen, Jr.
BY Andrus & Starke
Attorneys

United States Patent Office 3,127,871
Patented Apr. 7, 1964

3,127,871
INDIVIDUAL RESTING COMPARTMENTS
FOR ANIMALS
Morgan J. Jorgensen, Jr., Menasha, Wis.
(Rte. 2, Neenah, Wis.)
Filed Aug. 31, 1961, Ser. No. 135,259
16 Claims. (Cl. 119—27)

This invention relates to individual compartments in which an animal can rest undisturbed and is particularly adapted for dairy cattle and the like. Control means are provided which are responsive to the cattle entering and leaving a compartment to respectively close and open the compartment.

Modern dairy methods normally include milking parlors completely separate from the feeding and housing areas. The dairy cows are either locked in suitable individual stanchions or allowed to freely move about in a suitable large open housing with automatically operated feeding means mounted in some portion of the housing.

The efficiency and practical operation of modern dairy farms practically demands that grade A milk be produced. Governmental standards regarding cleanliness of the cows and the housing thereof are becoming more and more stringent. Further, dairy cows are relatively temperamental animals and during resting periods should preferably be isolated from one another to prevent one animal from bothering another.

Cows are creatures of habit and can be trained to follow a selected pattern. Cows are also relatively clean animals and will lie in a dry spot in preference to a wet dirty area. Consequently, by providing a clean, separate resting stall or compartment, the cows can be trained to enter such compartment whenever they desire to rest. Because the cows are creatures of habit, each cow can be practically assigned its own stall or compartment to which it will normally return. If the cow's usual compartment, however, is occupied, the nearest adjacent compartment can and will be taken by the cow without any adverse consequences.

The present invention is directed to the provision of individual resting stalls or compartments within a cow barn. Each compartment includes cow actuated entry and exit doors with automatic latching means which prevent another cow from entering a compartment as long as the first cow to enter the stall remains therein. Automatic means are provided to insure movement of a cow from the stall once she rises from the resting or lying position in order to maintain each of the individual stalls or compartments in a highly sanitary and clean condition.

In accordance with the present invention, a separate raised resting platform is preferably provided within each of the individual resting compartments. The raised platform serves to properly locate the cow within the compartment to insure proper actuation of the automatic latching means for initially locking of the resting stall. The raised platform also provides an improved and more comfortable resting area. The air circulating beneath the platform provides a warmer resting area than the cold concrete normally forming the floor of the cow barn.

The drawings furnished herewith illustrate the best mode presently contemplated for carrying out the invention.

Figure 1:
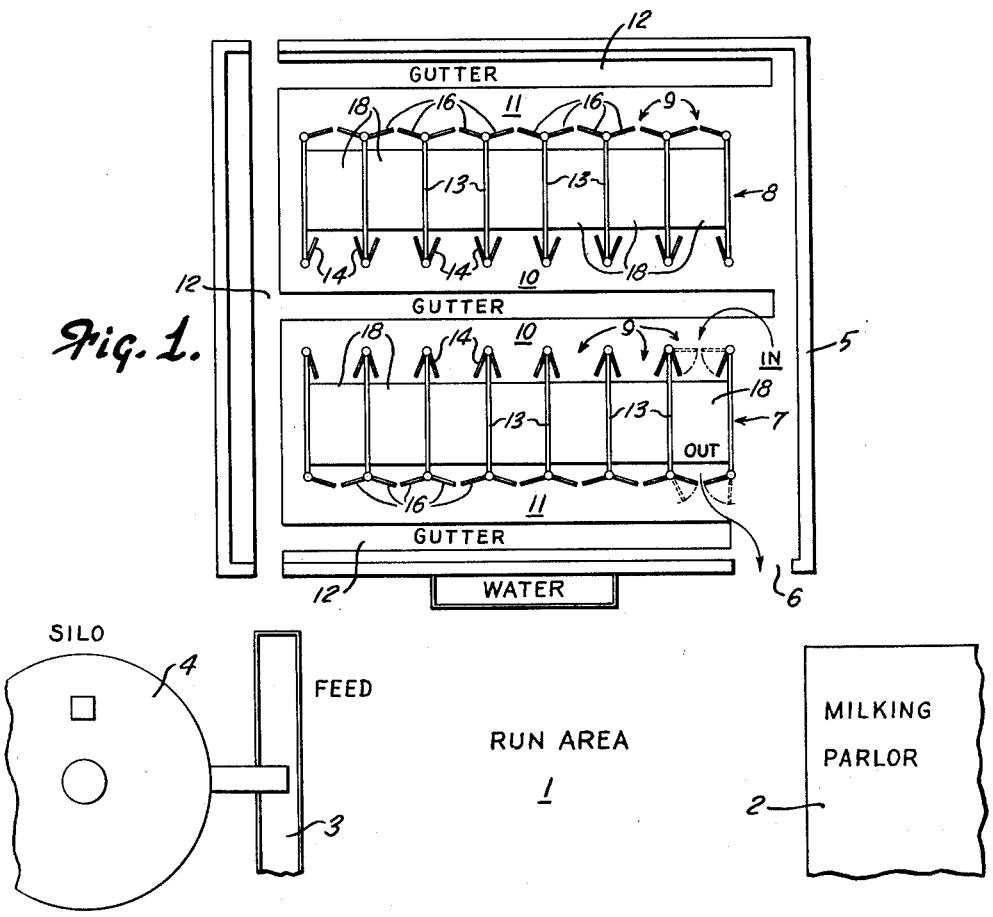
FIG. 1 is a diagrammatic illustration of a cattle housing area including a cow barn having a series of resting stalls embodying the present invention.

Referring to the drawings and particularly to FIG. 1, a cattle housing system is illustrated including a central open run area 1 with a milk parlor 2 and an automatic feed unit 3 on opposite sides of the run area 1. A silo 4 is associated with the automatic feed unit 3 for mechanical delivery of the feed to the automatic feed unit 3 to which cattle, not shown, may freely come for feeding. Along one side of the open area 1 and between the milk parlor 2 and the feed unit 3, a rest housing or cow barn 5 is provided. An entrance-exit barn door 6 is provided at the end of the barn 5 adjacent the milk parlor 2. In accordance with the present invention, the cows are allowed to run freely within the open area 1 between times for milking. Whenever a cow desires to lie down to rest, the cow enters the barn 5 which includes a series of two parallel banks 7 and 8 of individual resting stalls 9. The stall banks 7 and 8 extend longitudinally of the barn 5 and are laterally spaced to define an entrance walk 10 therebetween. Suitable exit walks 11 are provided on the opposite ends of the stalls 9 immediately adjacent the outer walls of the barn 5. Cleaning gutters 12, normally containing automatic cleaners, not shown, are provided within the walks 10 and 11 to maintain the cleanliness of the barn and to automatically carry all of the refuse from the barn 5.

Figure 2:
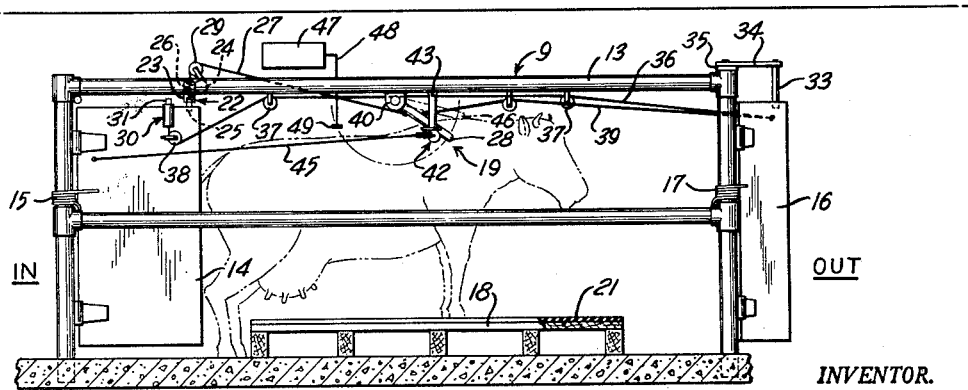
FIG. 2 is an enlarged side elevational view of a resting stall shown in FIG. 1.
Figure 3:
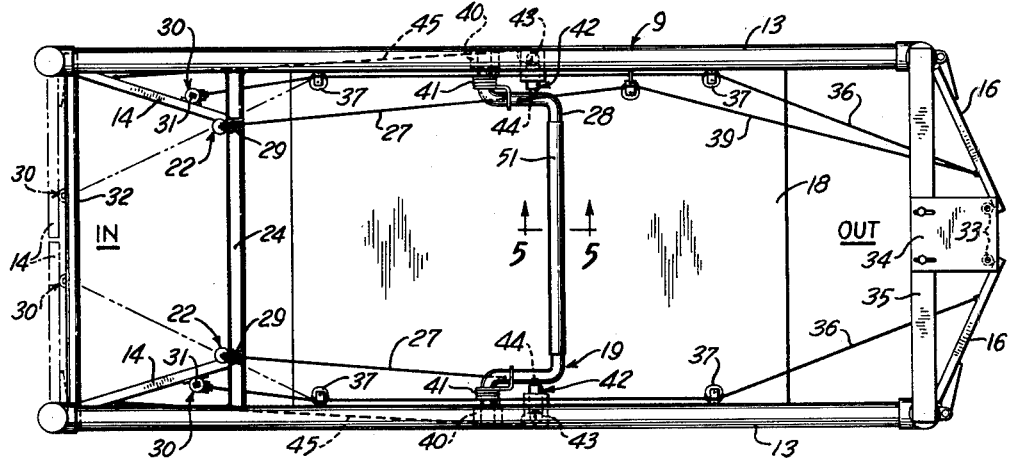
FIG. 3 is a top elevational view of FIG. 2.

Referring particularly to FIGS. 2 and 3, each of the individual resting stalls 9 includes similar side walls 13 formed of an open framework of horizontal and vertical tubes of steel or other suitable material. Each of the side walls 13 is generally common to immediately adjacent stalls 9. A pair of swinging entry gates or doors 14 are pivotally secured in position to the front of the side walls 13. A spring 15 encircles the vertical tube adjacent doors 14 and is secured at its opposite ends to the tube and to adjacent door 14. Springs 15 bias the doors 14 to the closed position, shown in FIGS. 3 and 4. A pair of swinging exit gates or doors 16 are similarly secured to the back of the stalls 9 and are biased by springs 17 to a closed position, as shown in FIGS. 1–3.

Figure 5:
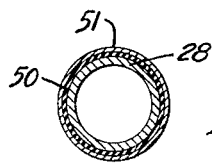
FIG. 5 is a sectional view taken on line 5—5 of FIG. 3.

A raised platform 18 is provided within each stall between the swinging doors 14 and 16 upon which the cow rests, as most clearly shown in FIG. 5.

A cow-operated control unit 19 is provided for actuating and controlling the opening and closing of the swinging doors 14 and 16 as well as insuring movement of the cow from the stall 9 immediately upon rising from the resting position shown in FIG. 5, as hereinafter described.

The illustrated platform 18 includes an understructure of suitable cross braces 20 which hold the platform 18 above the concrete base or floor of the barn 5. A rubberized cover 21 is provided on the upper surface of the platform 18 to provide a relatively soft and comfortable resting area for the cows. Any other suitable upper covering 21 may be employed.

In addition to providing a very comfortable resting area for the cow, the raised platform is employed to properly locate the cow for operation of the control unit 19 as a cow enters through the doors 14 and rises to leave through the door 16.

Each of the doors 14 and 16 is illustrated as a generally solid plate-like door of wood or other suitable material and which is biased to the closed position by the springs 15 and 17.

The entry doors 14 swing inwardly into the stall 9 and are biased to a closed position by the coil springs 15. The exit doors 16 swing outwardly of the stall 9 and are biased to the closed position by the coil springs 17.

The entry doors 14 are normally held open to freely allow a cow to enter into the compartment. A spring-loaded entry door lock or latch 22 is provided for each door 14 and includes a housing 23 secured to an upper cross tube 24 joining side wall 13 inwardly of the entrance to the stall 9. A lock or latch pin 25 is slidably mounted within the lower end of housing 23 and a spring 26 within the housing 23 continuously biases the latch pin 25 outwardly into the path of the entry door 14. The latch pin 25 is chamfered to allow the door 14 to swing inwardly past the pin. When the entry door 14 is swung inwardly past the latch pin 25, the pin prevents the return movement of the door 14.

A control cable 27 is provided for each of the latches 22 and is secured at one end to the corresponding latch pin 25 and at the opposite end to a horizontal control bar 28 forming a part of the cow-operated control unit 19. A suitable pulley 29 is secured to the cross tube 24 adjacent the latch 22 for aligning and supporting the cable 27.

As a cow enters the stall 9 and walks onto the platform 18, it engages the control bar 28 and pivots it forwardly, pulling on the control cables 27 and releasing the spring-loaded latches 22. The spring-loaded entry doors 14 then swing to the closed position as shown in phantom in FIGS. 1 and 3.

Spring-loaded latches 30 similar in construction to the previously described latches 22 are secured to the back side of doors 14. Latch pins 31 of latches 30 project upwardly above the top edge of the doors. When the doors 14 swing closed, the pins 31 releasably engage a top cross bar 32 joining the front upper ends of side walls 13. The doors 14 are thereby held in closed position until the latches 30 are subsequently released.

The exit doors 16 are continuously biased to the closed position by the springs 17. Depending stop arms 33 are secured by a bracket 34 to a cross brace 35 joining the back upper ends of the side walls 13. The arms 34 are located outwardly of the side walls 13 to hold the exit doors 16 partially opened outwardly of the stall and provide a space for the nose of a cow. A cow instinctively pushes forward if an opening large enough for its nose is provided. The cow, upon rising from the platform 18, moves forwardly placing its nose between the exit doors 16 and then, by habit, nudges and pushes the doors 16 outwardly with its head. However, cows cannot enter the stall 9 from the exit walks 11 through the exit doors 16 because the stop arms 33 prevent the inward opening of the doors.

Rear door operated cables 36 are secured at one end to each of the doors 16 and at the opposite end to the latch pins 31 of the latches 30 carried by the entry doors 14. Guide pulleys 37 are secured to the upper portions of the side walls 13 and support the cable 36 from the path of a cow. A guide pulley 38 is also secured to each of the front doors 14 one each immediately below the latches 30 with the corresponding cable 36 extending downwardly from the latches 30 and around the pulley 38. Latches 30 hold the doors 14 closed to prevent a second cow from entering as previously described. When the cow rises from the platform 18 and moves outwardly through the exit doors 16, an outward pull is exerted on the cables 36 to first retract the respective latch pins 31 and thereby release the doors 14 and secondly to pull on the doors 14 proper through the pulley 38 and pivot the doors 14 to the open position, shown in FIGS. 1-3.

A reset cable 39 is secured at opposite ends to an exit door 16 and to control bar 28 for returning the control bar 28 of control unit 19 to normal standby position, as shown in FIG. 2, in response to the movement of a cow from stall 9.

Figure 4:
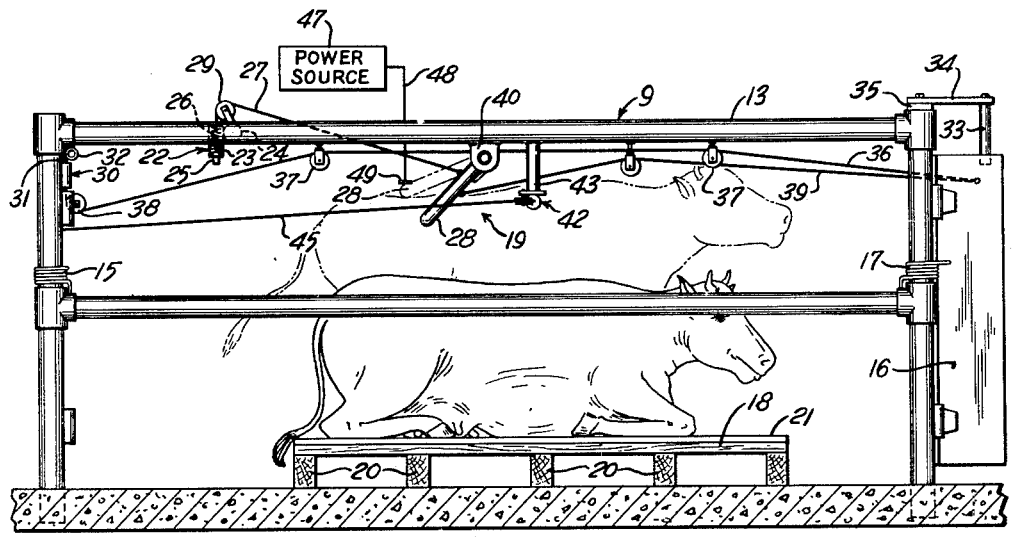
FIG. 4 is a view similar to FIG. 2 showing the resting stall with the cow lying in a resting position.

The cow-operated control unit 19 includes the control bar 28 which is formed as a laterally extending element having upwardly extending side arms defining a generally U-shaped member. The upper ends of side arms of bar 28 are bent outwardly and pivotally connected to the top of the stall 9 by suitable brackets 40. The control bar is mounted somewhat generally centrally of the longitude length of the stall such that it is aligned with the rump portion of the cow when it is in the resting position as shown in FIG. 4. Control bar springs 41, shown in FIG. 3, encircle the outbent ends of the arms of the bar 28 and resiliently bias the control bar 28 in a clockwise direction, as viewed in FIG. 2.

Spring-loaded latches 42 generally similar in construction to latches 22 are secured to the side walls 13 by suitable brackets 43 on the exit side of the pivot connection of control bar 28. Latches 42 include inwardly projecting latch pins 44 resiliently biased into the path of the control side arms of bar 28. The latches 42 normally maintain the control bar pivoted counter-clockwise from the dead center or lowermost position, as shown in FIG. 2.

Control bar release cables 45 are connected one each to the latch pin 44 and at the opposite end to the entry doors 14. Upon the closing of the entry doors 14, pins 44 are retracted to allow the free movement of the control bar 28. As previously described, the front doors 14 are released to move to the closed position in response to the cow entering between the doors 14 and moving forwardly onto the platform 18. This occurs as a result of the pivoting of the control bar 28 in a counter-clockwise direction to the phantom line position 46 shown in FIG. 2. As the doors 14 close, cables 45 retract and hold the pins 44 from the path of side arms of control bar 28 until the doors 14 are again opened. When the cow lies down to the resting position as shown in FIG. 4, the torque of control bar spring 41 pivots the control bar 28 in a clockwise direction to the position of FIG. 4 on the opposite side of the lowermost position of the control bar.

In summary, a cow can enter a stall 9 having the doors 14 open and automatically latches the doors 14 closed to prevent another cow from entering. The exit doors 16 are one-way and consequently a cow cannot enter from the exit walks 11. The first cow can then lie down within the stall 9 and rest undisturbed by other cows. Platform 18 provides a very comfortable and sanitary resting area.

When the cow stands up to leave, the control bar 28 is engaged and pivoted clockwise and thus upwardly to the phantom line position of FIG. 4. As presently described, this pivoting of bar 28 gives the cow a slight shock which will cause her to immediately walk out of the stall.

An electrical discharge device 47 is provided with a common circuit wire 48 connected to a plurality of coupling contacts 49 provided one within each stall 9. The coupling contact 49 is mounted somewhat below the top of the stall 9 and in the path of the uppermost movement of the control bar 28 as a result of the cow rising from the rest position.

The illustrated bar 28 is provided with an insulating sleeve 50 and an outer shock sleeve 51 which is aligned with and engages the coupling contact 49 when the bar 28 is pivoted upwardly to the phantom line position of FIG. 4. The shock sleeve 51 extends laterally across the lower portion of the bar 28 and is engaged by the cow which stands up to leave stall 9. The cow is given a very slight electrical shock which is sufficient to insure its movement from the stall 9 but is otherwise insufficient to adversely affect the cow.

The operation of the illustrated embodiment of the invention is summarized as follows.

A cow enters the barn from the run area 1 and enters a selected stall 9 from the walk 10.

As the cow walks onto the platform 18, the control bar 28 is engaged and pivoted upwardly to the phantom line position of FIG. 2. The movement of bar 28 pulls inwardly on the control cables 45 and releases latches 22. When the cows then lie down on platform 18 to rest, as shown in FIG. 4, springs 15 pivot the doors 14 closed and latches 30 engaging the cross bar 32 prevent the return movement of the doors 14. The springs 15 are selected to close the doors and hold the doors in the laterally extending position shown in the phantom line position of FIG. 3. Control bar 28 is pivoted to the full line position of FIG. 4.

The cow may then lie within the stall 9 undisturbed by any of the other cows.

When the cow rises to leave the stall, the control bar 28 is pivoted upwardly until the shock sleeve 51 engages the contact 49 whereupon a slight shock is given to the cow and causes her to move outwardly through the exit doors 16.

After a short period of time, the cow anticipates the shock and will tend to move out of the stall as they arise to avoid the shock. In any event, the slight electrical shock is insufficient to cause any adverse effects on the cow.

The cow leaves the stall by nudging the doors 16 with its head and then moving outwardly through the spring-loaded doors. As soon as the cow moves out of the stall 9, the doors 16 return to the position shown in the drawings.

As the cow leaves the stall, the outward swinging movement of the doors 16 exerts a pull on the cables 36 and 39.

The outward pull on the cables 36 withdraws the latch pins 31 of the entry door latches 30 and releases the entry doors 14 which return to the normally open position of FIGS. 2 and 3. The continued outward pull on cables 36 results in the opening of the doors 14 until they again are engaged by latches 22 and releasably held open thereby.

The movement of cable 39 resets the control bar 28 to the normal standby position shown in full line in FIGS. 2 and 3.

In this manner, individual resting compartments are provided with a highly sanitary nature. The cows are provided with a very convenient and comfortable resting area which is very conducive to provision of high grade milk and contented cows.

The present invention thus provides improved means for housing cattle with a minimum operational and installation expense.

Various modes of carrying out the invention are contemplated as being within the scope of the following claims particularly pointing out and distinctly claiming the subject matter which is regarded as the invention.

I claim:

1. A resting stall for animals, comprising an enclosure having entry door means and exit door means, animal-operated latch means for latching the entry door means closed in response to the movement of an animal into the stall, and said exit door means including releasing means associated with the stalls and the latch means and actuated by the movement by the animal through the exit door means and thereby releasing said latch means in response to the movement of an animal from the stall.

2. The construction of claim 1 having means positively urging the animal from the stall upon rising within the stall after lying therein.

3. A resting stall for animals, comprising an enclosure having entry door means and exit door means, latch means to hold the entry door means open, latch operator means for latching the entry door means closed, means responsive to the movement of an animal into the stall to release the first latch means and to actuate the latch operator means to a holding position, and said exit door means including releasing means associated with the stall and the latch means and actuated by the movement by the animal through the exit door means and thereby releasing the second latch means in response to the movement of an animal from the stall and actuating the first latch means to a holding position.

4. The resting stall of claim 3 wherein the means responsive to the movement of an animal into the stall includes a member movably secured for longitudinal movement within the stall and in the path of an incoming animal, means urging the member to selected exiting position in the path of an animal, holding means holding the member in a selected position spaced forwardly of the exiting position and against movement toward the exiting position, means operatively connecting the member to the first-named latch means to release the latch means in response to movement of the member forwardly of the selected position to release the entry door means, means operatively connecting the entry door means to the holding means to release the holding means during the period the entry door means is in a closed position and permitting the member to move to the exiting position, means responsive to selected engagement of the member in the exiting position by the animal to urge the animal through the exit door means, and means operatively connecting the exit door means to the second-named latch means and to the member to open the entry door means and reset the member to the selected position in response to opening of the exit door means.

5. A resting stall for animals, comprising an enclosure having aligned entry door means and exit door means, means biasing the entry doors closed, first latch means for holding the entry door means open, second latch means for holding the entry door means closed, a pivoting arm depending into the stall in the path of an incoming animal and pivoted in response to the movement of an animal into the stall, cable means connected to the arm and to the first latch means, means biasing the exit door means closed, and cable means connected to the exit door means and to the second latch means for releasing said latch means in response to the movement of an animal through the exit door means.

6. A resting stall for individual livestock, comprising an enclosure having aligned entry door means and exit door means defining a resting area, a raised platform between the respective door means, control means disposed within the upper central portion of the enclosure and including a depending control member operatively engaged by the livestock entering the stall and standing upon the platform, means coupling the control member to the entry door means to close the entry door upon complete entrance of an animal onto the platform, automatic latch means releasably latching the entry doors closed, exiting means for positively urging an animal in a stall to move outwardly through the exit door means, means coupled to the control member and to the entry doors and responsive to closing of the entry door means to reposition the control member and enable the control member to actuate said exiting means when an animal rises from the platform, means resiliently biasing the exit doors closed, means coupling the exit door means to the entry door means and to the automatic latch means to open the entry means as the animal passes through the exit door means, and means connected to the exit door means and to the control member to return the control member to the initial position.

7. A resting stall for an individual cow which comprises side walls joined by top cross members defining a resting enclosure through which a cow may pass from an entry end to an exit end, a raised resting platform spanning the distance between the side walls and spaced from the ends of the stall, a pair of swinging entry doors at the entry end biased to a closed position, releasable door latches secured to the stall and arranged to releasably engage and hold the entry doors open for free entry of a cow, a control bar pivotally attached to a top cross member and extending downwardly between the side walls, means urging the control bar toward the entry to the stall, releasable bar latches mounted on the side walls and disposed in holding engagement with the control bar and positioning the control bar slightly toward the stall exit and in the path of the incoming cow, cables connecting the releasable door latches to the control bar to release the entry doors upon complete movement of a cow onto the platform, control bar release cables connected to the entry doors and to the bar latches to release the control bar for pivotal movement to a position toward the entry to the stall and in the path of the cow, door-closed latch means to releasably hold the entry doors closed, a pair of swinging exit doors at the exit end of the stall biased to a closed position, stop means secured to the stall and in the path of the exit doors to maintain the exit doors slightly open and to prevent movement into the stall through the exit doors, and cable means connected to the control bar and to the door-closed latch means to reset the control bar and to release and return the entry doors to the open position upon movement of a cow from the stall.

8. A resting stall for an individual cow which comprises side walls and top cross braces defining a resting enclosure through which a cow may pass from an entry end to an exit end, a raised resting platform spanning the distance between the side walls and spaced from the ends of the stall, entry door means biased to close the entry end of the stall, door latch means arranged to releasably engage and hold the entry doors open for free entry of a cow, a control member pivotally attached to a top cross brace and depending between the side walls in the path of a cow, means urging the control member to a selected position, releasable member latch means holding the control member spaced from the selected position toward the stall exit and in the path of the incoming cow, means connecting the door latch means to the control member to release the entry doors upon complete inward movement of a cow, control bar release means connecting the entry doors to the member latch means to release the control member for pivotal movement to the selected position toward the entry to the stall and in the path of the cow, door-closed latch means to hold the entry door means closed, exit door means biased to close the exit end of the stall, means to prevent entrance to the stall through the exit door means, means connecting the control member to the door-closed latch means to reset the control member and to release and return the entry door means to the open position upon movement of a cow from the stall, and means positioned to be actuated by the control member upon engagement of the control member in the selected position by a cow to urge the cow to leave the stall.

9. A resting stall for an individual cow which comprises side walls and upper side wall joining members defining a resting enclosure through which a cow may pass from an entry end to an exit end, a raised resting platform spanning the distance between the side walls and spaced from the ends of the stall, a pair of swinging doors at the entry end, spring means biasing the swinging doors to a closed position, spring-loaded door latches secured to an upper side wall joining member and arranged to releasably engage and hold the entry doors open for free entry of a cow, a U-shaped control bar pivotally attached between and extending downwardly between the side walls, spring means urging the control bar toward the entry to the stall, releasable spring-loaded latches secured to the side walls and projecting into holding engagement with the arms of the control bar and positioning the control bar slightly toward the stall exit and in the path of the incoming cow, cables connecting the door latches to the control bar to release the entry doors upon complete inward movement of a cow, control bar release cables connected to the entry doors and to the bar latches to release the control bar for pivotal movement to a position toward the entry to the stall and in the path of the cow, door-closed latch means to hold the entry doors closed, a pair of swinging exit doors at the exit end of the stall, spring means connected to bias the exit doors closed, stop means secured to the stall and in the path of the exit doors to maintain the exit doors slightly open and to prevent movement into the stall through the exit doors, cable means connected to the control bar and to the door-closed latch means and to the control bar for releasing the entry door and returning the entry doors to the open position upon movement of a cow from the stall, an electrical shock contact mounted to the entry side of the control bar and in the upward path of the control bar, and a transfer contact element on the control bar in the path of shock contact of a cow upon complete rising from the platform engaging transfer element and pivoting the control bar to engage the transfer element and the contact with a resulting slight electrical shock to the cow.

10. A resting stall for animals, comprising an enclosure having aligned entrance door means and exit door means defining a resting area, said exit door means being directly actuated by one of said animals, a platform between the respective door means, control means operatively engaged by the animal entering the stall and standing upon the platform to lock the entrance door means closed, and means responsive to the animal leaving through the exit door means to open the entrance door means.

11. The construction of claim 10 wherein spacing members support said platform above the floor of the stall, and an upper soft covering is disposed on the platform to provide a comfortable resting place for the animals.

12. A barn for housing cattle, comprising a bank of individual resting stalls arranged in side-by-side relation within the barn with an entry walk and an exit walk on opposite sides of the bank, each of said stalls having entry door means adjacent the entry wall and having exit door means adjacent the exit wall, individual control means for each stall including means connected to the entry door means and the exit door means to releasably latch the entry door means closed in response to entry of an animal into the stall and said exit door means also including means to release the entry door means in response to exit of the same animal through the exit door means, and means to prevent entrance to a stall through the exit door means.

13. The construction of claim 12 having shocking means arranged to force the cow forwardly from the stall upon rising from a lying position.

14. The construction of claim 13 wherein said shocking means includes an operating shock device having a first position in spaced relation to a standing cow and second position in the path of a standing cow, means responsive to entry and lying down of a cow to move the shock device from the first position to the second position, and means responsive to the exiting of a cow through the exit to reset the shock device from the second position to the first position.

15. A resting stall for animals, comprising a foundation laid on a ground area, confining wall means defining a compartment larger than the animals, and a raised platform disposed within said stall and defining a resting area therein, said raised platform being of a length not less than a cow's length and the ends of said platform being spaced from the entrance and the exit to the stall less than the length of the platform.

16. The resting stall of claim 15 having entry door means adapted to open into the stall, animal actuated latching means for closing said entry door means, and said platform being located to position said animal from the path of the doors when the animal lies down within the stall.

References Cited in the file of this patent

UNITED STATES PATENTS

| | | |
|---|---|---|
| 595,504 | Underhill | Dec. 14, 1897 |
| 2,110,909 | Henderson | Mar. 15, 1938 |
| 2,779,310 | Myer et al. | Jan. 29, 1957 |
| 2,814,271 | Black | Nov. 26, 1957 |

OTHER REFERENCES

Starline Catalogue No. 261, dated Jan. 21, 1933, page 6.
Starline Catalogue No. 119, dated July 1953, page 3.